United States Patent
Johanson

(10) Patent No.: US 6,449,342 B1
(45) Date of Patent: Sep. 10, 2002

(54) RECORDED VOICE MESSAGE SUMMARY

(75) Inventor: James A. Johanson, Macungie, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/305,207

(22) Filed: May 5, 1999

(51) Int. Cl.[7] .............................................. H04M 1/652
(52) U.S. Cl. .................................. 379/88.11; 379/88.14
(58) Field of Search ............................ 379/67.1, 88.11, 379/88.12, 88.13, 88.14, 88.19, 88.2, 88.22, 88.23

(56) References Cited

U.S. PATENT DOCUMENTS

| | | | | |
|---|---|---|---|---|
| 4,837,798 A | * | 6/1989 | Cohen et al. ................. | 379/88 |
| 5,381,466 A | * | 1/1995 | Shibayama et al. ........... | 379/88 |
| 5,406,557 A | * | 4/1995 | Baudoin ....................... | 379/94 |
| 5,479,411 A | * | 12/1995 | Klein ........................... | 379/88 |
| 5,524,137 A | * | 6/1996 | Rhee ............................ | 379/67 |
| 5,557,659 A | * | 9/1996 | Hyde-Thomson ............ | 379/88 |
| 5,712,901 A | * | 1/1998 | Meermans .................... | 379/88 |
| 5,724,410 A | * | 3/1998 | Parvalescu et al. ........... | 379/88 |
| 5,781,614 A | * | 7/1998 | Brunson ....................... | 379/88 |
| 5,870,454 A | * | 2/1999 | Dahlen .................... | 379/88.14 |
| 5,999,594 A | * | 12/1999 | Mizoguchi et al. ...... | 379/88.14 |
| 6,061,718 A | * | 5/2000 | Nelson ....................... | 709/206 |
| 6,192,111 B1 | * | 2/2001 | Wu ......................... | 379/88.13 |
| 2001/0033639 A1 | * | 10/2001 | Martin .................... | 379/88.14 |

OTHER PUBLICATIONS

Voice Message Summary for Voice Services, Yasushita Kato, 1994 International Symposium on Speech, Image Processing and Neural Networks, Apr. 13–16, 1994, Hong Kong, 1994 IEEE, pp. 22–625.*

* cited by examiner

*Primary Examiner*—Scott L. Weaver
(74) *Attorney, Agent, or Firm*—William H. Bollman

(57) ABSTRACT

Apparatus and method to record a verbal or textual summary for a particular voice message in a voice message system such as a telephone answering device. A message summary memory allows storage of either verbal or textual voice message summaries recorded by the calling party and/or by the user. The voice message summaries are retrievable by the user for playback or display before or during playback of the voice message.

22 Claims, 9 Drawing Sheets

FIG. 2

| MESSAGE # | SUMMARY |
|---|---|
| 2 | MOTHER CALLING TO TELL ME CHILDREN ARE SICK |
| CID DATA | |
| (800) 555-1212 SMITH | |

RECORDED VOICE MESSAGE SUMMARY

BACKGROUND OF THE INVENTION

1. Field of the Invention

This invention relates generally to a voice messaging system. More particularly, it relates to a voice messaging system such as a telephone answering device which is capable of allowing a caller and/or a user to record a voice or text message summary for a recorded voice message.

2. Background of Related Art

Voice messaging systems (e.g., telephone answering devices (TADs)) are useful devices for both the home and office. Larger voice messaging systems in general work in conjunction with a private branch exchange (PBX) unit to provide voice mailboxes for a large number of users. Smaller voice messaging systems, e.g., telephone answering devices typically operate on a single telephone line and answer an incoming call to an unused (i.e., on-hook) telephone after a predetermined number of rings.

Voice messaging systems and telephone answering devices cause a telephone line to enter an off-hook condition, then play an outgoing message to the caller. After the outgoing message is completed, the caller is allowed to record a voice message on the voice messaging system, e.g., telephone answering device. At a later time, the voice message is replayed by the user, either local to the telephone answering device or via remote connection from another telephone through the public switched telephone network (PSTN).

FIG. 9 illustrates a conventional telephone answering device capable of recording a voice message together with a telephone number and/or household or business name with respect to an incoming call.

In FIG. 9, a telephone answering device 11 is connected to a telephone company central office 13 via a telephone line 15. A telephone line interface (TLI) 17 in the telephone answering device 11 provides the conventional isolation, DC and AC impedance as required by telephone company standards. The telephone line interface 17 also provides a ring detect signal to a controller 19. The controller 19 can be any suitable processor, e.g., microprocessor, microcontroller, or digital signal processor (DSP). The ring detect signal indicates to the controller 19 the ringing of an incoming call on the telephone line 15.

After a predetermined number of ring signals, the telephone answering device 11 causes the telephone line interface 17 to place the telephone line 15 in an off-hook state. A voice recorder/playback audio module 21 plays an outgoing greeting message over the telephone line 15 to the caller. Upon completion of the outgoing greeting message, the caller is typically allowed to record a voice message for storage in voice message memory 23 under the control of the controller 19. A keypad 25 allows the user to select various modes of operation, including the playback of recorded voice messages.

The conventional telephone answering device 11 illustrated in FIG. 9 includes a call related information detector/receiver 27 to detect and receive call related information regarding an incoming caller, e.g., their telephone number and/or household or business name. The received call related information is displayed by the controller 19 on display 29, and may be associated with corresponding recorded voice messages.

Call related information services such as Calling Identity Delivery (Caller ID) allow a user to receive information identifying the incoming caller before the incoming call is answered. Typical Caller ID information includes the telephone number and/or household or business name of the calling party.

In operation, basic call information such as Caller ID information is transmitted from the local telephone company to the called party while the called party's telephone is in a hung-up or on-hook state, e.g., between the first and second rings. Advanced call related information services also allow a user to receive information regarding an incoming caller while the telephone is in use. For instance, with Caller ID Call Waiting (CIDCW) service the called party can receive Caller ID information (e.g., a telephone number and/or household or business name) while in an established telephone call with another party on the same telephone line.

Using Caller ID information, recorded voice messages can be associated with the name and/or telephone number of the caller who recorded the particular voice message.

To determine the content of a recorded voice message, even if previously played back, a user must actually listen to the recorded voice message from the calling party. The content of a message may be recalled by a user based on recorded call related information associated with a particular voice message, but if the caller who recorded the voice message calls the particular called party fairly often, call related information may not be sufficient to inform the user as to the content of the recorded voice message.

There is thus a need for an improved voice messaging system which provides a user with summary information sufficient to inform the user as to the content of the particular voice messages.

SUMMARY OF THE INVENTION

In accordance with the principles of the present invention, a voice messaging system comprises a telephone line interface and a controller, a voice message memory, a message summary module, and message summary memory. The message summary module directs storage of a summary message regarding a voice message stored in the voice message memory into the message summary memory.

In accordance with another aspect of the present invention, an apparatus for providing a message summary to a voice message comprises means for retrieving a recorded message summary including content corresponding to a recorded voice message, and means for subsequently and separately retrieving the recorded voice message.

A method for recording a summary relating to content of an associated voice message recorded on a voice messaging system in accordance with yet another aspect of the present invention comprises recording a voice message. A message summary corresponding to content of the voice message is also recorded. The message summary is associated with the voice message.

BRIEF DESCRIPTION OF THE DRAWINGS

Features and advantages of the present invention will become apparent to those skilled in the art from the following description with reference to the drawings, in which:

FIG. 2 illustrates an embodiment of a message summary display for a telephone answering device shown in FIG. 1, in accordance with the principles of the present invention.

DETAILED DESCRIPTION OF ILLUSTRATIVE EMBODIMENTS

The present invention provides a voice messaging system, e.g., a telephone answering device and method for allowing a calling party or a user to record a summary for a recorded voice message, which can be retrieved by the user to bypass the need to listen to the underlying recorded voice message. The message summaries may be verbal or textual. A verbal message summary may be recorded by the user or caller, and is preferably limited to a short length, e.g., ten (10) seconds or less. A textual message summary may be created in any appropriate manner, e.g., using keyboard input or voice-to-text conversion of a verbal summary. The verbal message summary is preferably played back over a speaker, whereas the textual message summary is preferably displayed on an appropriate text or graphics display.

In operation, a calling party calls a user which does not answer their telephone. After a predetermined number of rings, a telephone answering device in accordance with the principles of the present invention automatically answers the incoming telephone call by placing the telephone line in an off-hook condition and initiating a standard outgoing greeting message. Thereafter, the calling party is permitted to record a voice message on the telephone answering device, which is stored in voice message memory via a voice recorder/playback module.

In accordance with one aspect of the present invention, the calling party is also allowed to leave a summary of the voice message currently recorded for storage in message summary memory. The message summary memory may be co-located with the voice message memory, and is preferably non-volatile, e.g., Flash memory. In accordance with another embodiment, the user, after an initial playback of the relevant voice message, may record a verbal or textual message summary relating to the underlying voice message.

Thus, in accordance with the principles of the present invention, the user then has access to either the shorter message summary, or to the full length underlying voice message itself.

Although the present invention is shown embodied in a telephone answering device, the present invention is equally applicable to voice messaging systems in general.

Figure 1:
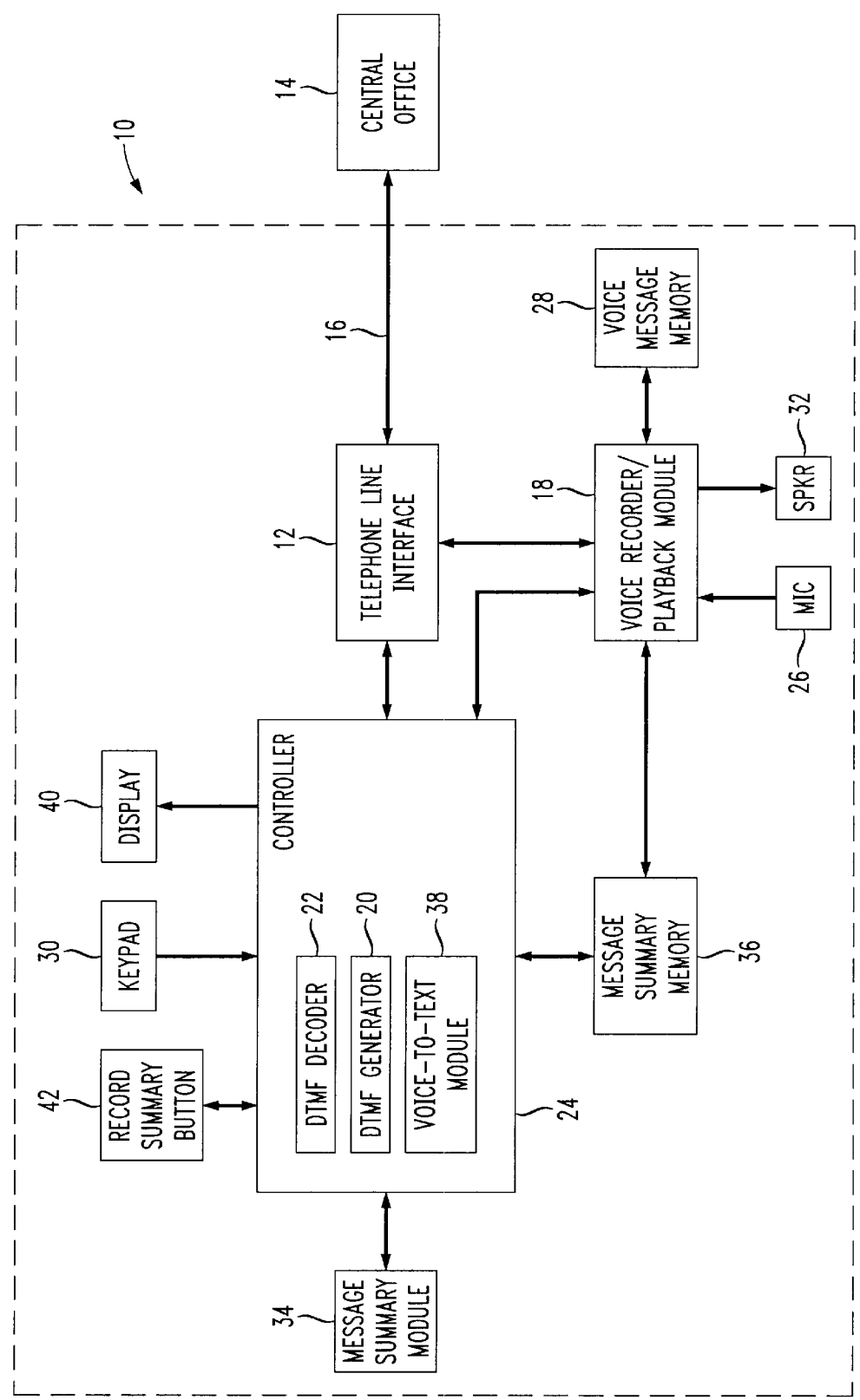
FIG. 1 illustrates an embodiment of a telephone answering device including a message summary module and message summary memory to allow either the calling party or a user of the telephone answering device to record a verbal or textual summary for a desired voice message, in accordance with the principles of the present invention.

FIG. 1 illustrates an embodiment of a telephone answering device, indicated generally at 10, capable of allowing a calling party or user to record a message summary for an underlying recorded voice message, either in verbal or textual form, in accordance with the principles of the present invention.

In the embodiment of FIG. 1, the telephone answering device 10 includes at least one telephone line interface 12 for interconnection with a telephone company central office 14 via a telephone line 16. The telephone line interface 12 interconnects the telephone line 16 with a voice recorder/playback module 18. The user can, if desired, record a customized outgoing greeting message into the telephone answering device 10 using a microphone 26 connected to the voice recorder/playback module 18.

After a desired number of ring signals, the telephone answering device 10 causes the telephone line interface 12 to place the telephone line 16 in an off-hook state, and instructs the voice recorder/playback module 18 to play an outgoing greeting message retrieved from the voice message memory 28 on the telephone line 16 to the calling party. Upon completion of the outgoing greeting message, the calling party can record a voice message in the voice message memory 28 under the control of a controller 24.

The controller 24 controls the overall functions of the telephone answering device 10 and may be any suitable processor, e.g. a microprocessor, a microcontroller, or a digital signal processor (DSP).

The keypad 30 allows the user to select various modes of operation, including the playback of voice messages through a speaker 32 connected to the voice recorder/playback module 18, or the recordal of a verbal message summary relating to a particular recorded voice message through the microphone 26.

Importantly, the telephone answering device 10 illustrated in FIG. 1 further includes a message summary module 34 and a message summary memory 36. The message summary module 34 controls recording into and playback from the message summary memory 36. The message summary memory 36 stores verbal or textual message summaries associated with underlying recorded voice messages stored in the voice message memory 28. The message summary module 34 may be an appropriate software program running in the controller 24, or may be external to the controller 24 using another processor but nevertheless preferably in communication with the controller 24.

In accordance with the principles of the present invention, upon recordal of a voice message on the telephone answering device 10, the calling party is allowed to record a verbal message summary in the message summary memory 36 for retrieval by the user.

In accordance with another embodiment, the controller 24 can forward the digitized message summary to an appropriate voice-to-text conversion module 38 operating either internal or external to the controller 24. The voice-to-text conversion module 38 converts voice into textual (e.g., ASCII) data, which may then be displayed on an appropriate text or graphics display 40 for the user to review, e.g., before playback of the underlying recorded voice message.

An example of an appropriate display 40 for reviewing textual message summaries is shown in FIG. 2.

In FIG. 2, a textual summary of an exemplary message summary is displayed on the display 40, e.g., together with call related information 275 such as a telephone number and/or name of the recording party, and perhaps a message count number 273. The message summary is preferably limited to the capacity of the particular text display 40. However, it is within the scope of the present invention to include scroll keys in communication with the controller 24 to allow up and down scrolling of longer textual message summaries. It should also be noted that the call related information, e.g., Caller ID information, can optionally be included.

Alternatively, if the calling party decides not to leave a message summary in the message summary memory 36, the user can record their own message summary. To this end, the telephone answering device 10 includes a record summary button 42 activatable by the user to verbally record a message summary for storage by the message summary module 34 in the message summary memory 36. A voice-to-text module 38 may be included to allow the user to display the text of a verbal message (i.e., a textual message summary).

The message summary module 34, the message summary memory 36, and the voice-to-text module 38 may be implemented in software or firmware within the program code of the controller 24. Of course, the message summary module 34, the message summary memory 36, and/or the voice-to-text module 38 can be implemented separate from the controller 24 but nevertheless are preferably in communication with the controller 24.

Textual conversion of a verbal message summary can be performed on demand, e.g., in response to the activation of one or more appropriate keys on the keypad 30.

Thus, through the implementation of the message summary module 34, the message summary memory 36, and the voice-to-text module 38, the user can revisit previously listened to voice messages by quickly reviewing message summary information rather than the original voice message. The review can be performed using either a display of a textual message summary, or by listening to a verbal message summary output through the speaker 32.

The telephone answering device 10 of the present invention may further include a dual tone, multiple frequency (DTMF) generator 20 and a DTMF decoder 22 implemented within the controller 24. The DTMF generator 20 provides touch tone signals for use by the telephone answering device 10 to dial out on the telephone line 16 when prompted by the user of the telephone answering device 10. The DTMF decoder 22 provides a conventional mechanism for detection of commands input via a touch tone keypad 30.

Preferably, when the message summary module 34 is activated by the user, the telephone answering device 10 ceases voice message playback, e.g., by pausing any voice message playback already in progress, by stopping any voice message playback and preserving the unlistened to and/or partially listened to voice messages for later playback. The message summary is then either played for the user or displayed for the user on the display 40.

It should be noted that a telephone answering device in accordance with the present invention will allow a user to record a message summary for any voice message left on the telephone answering device 10, thus allowing the determination of the contents of a voice message without requiring playback of the full-length voice message.

Figure 3:
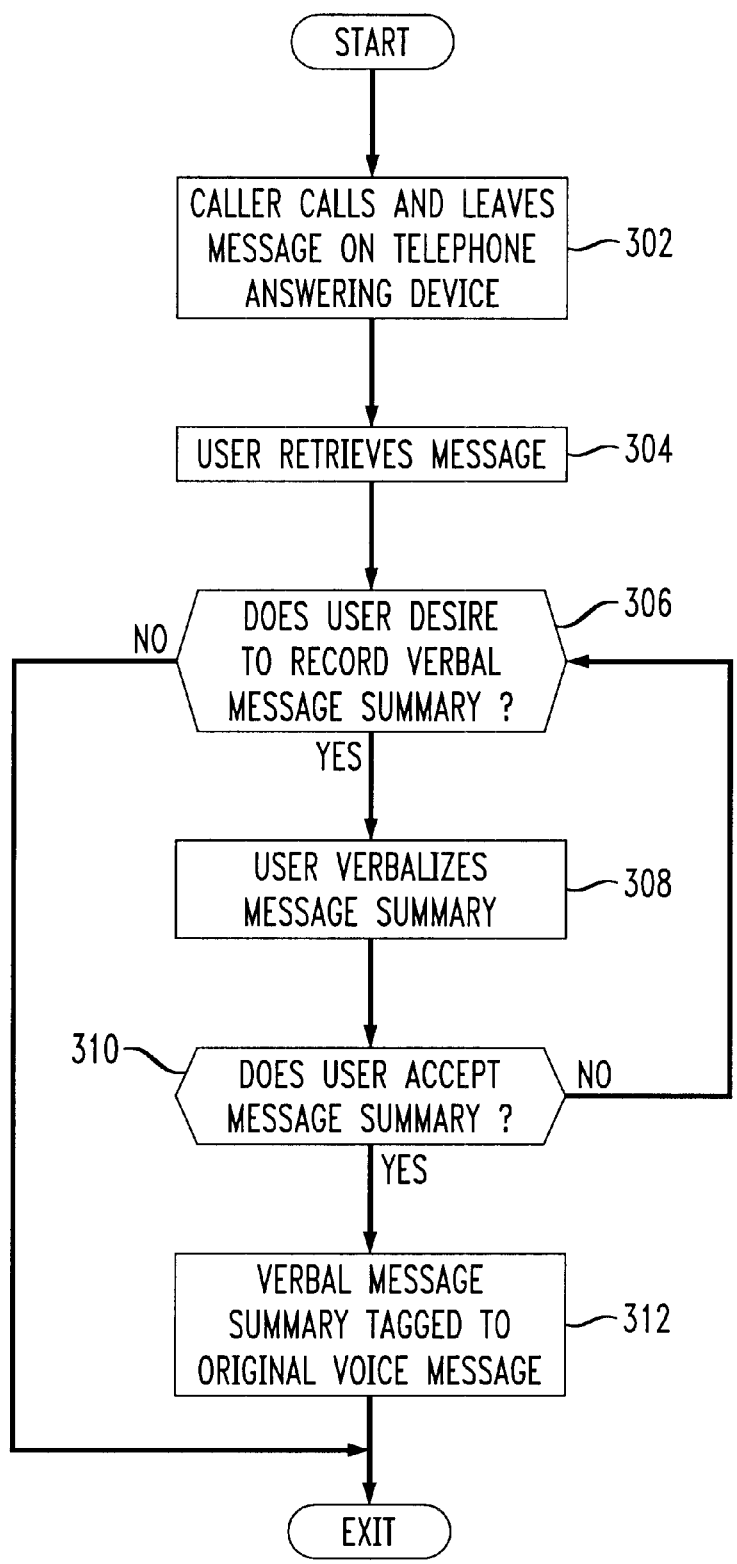
FIG. 3 is a flow chart illustrating an exemplary process by which a user records a verbal summary for a desired recorded voice message with the telephone answering device shown in FIG. 1.

An example of the operation of a user recording a verbal message summary using a telephone answering device such as that shown in FIG. 1 is shown in FIG. 3.

In particular, with reference to FIG. 3, as shown in step 302, after a predetermined number of rings, the telephone answering device 10 answers the incoming call by causing the telephone line interface 12 to place the telephone line 16 in an off-hook condition. The telephone answering device 10 plays an outgoing greeting message such as "I'm not available right now, please leave a message" or other similar greeting, and a voice message is recorded in otherwise conventional fashion in the voice message memory 28 of the telephone answering device 10. An incoming caller may then leave a voice message on the telephone answering device 10.

In step 304, the user retrieves the voice message.

In decision step 306, the user determines whether or not to record a verbal message summary.

If the user desires to record a verbal message summary, in step 308, the user verbalizes a message summary which is stored in the message summary memory 36.

In decision step 310, the user is given the option of accepting the recorded message summary or of recording a new message summary.

In step 312, if the message summary is accepted by the user, the verbal message summary is tagged or otherwise linked in header information to the underlying voice message stored elsewhere for retrieval by the user at a later desired time.

Figure 4:
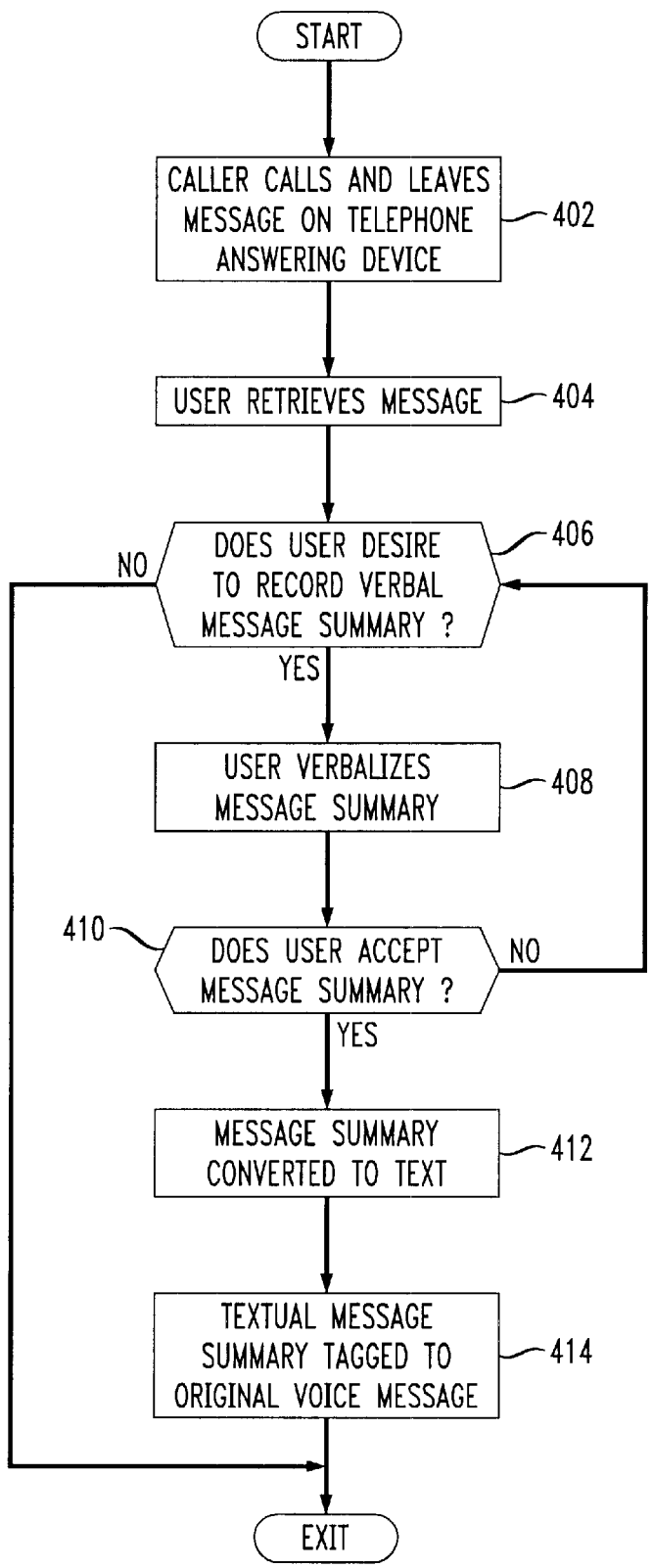
FIG. 4 is a flow chart illustrating an exemplary process by which a user records a textual summary for a desired recorded voice message with the telephone answering device shown in FIG. 1.

An example of the operation of a user recording a textual message summary using a telephone answering device such as that shown in FIG. 1 is shown in FIG. 4.

In particular, with reference to FIG. 4, an incoming caller leaves a voice message on the telephone answering device 10 in step 402.

In step 404, the user retrieves the voice message.

In decision step 406, the user determines whether or not to record a textual message summary.

If the user desires to record a textual message summary, in step 408, the user verbalizes a message summary which is stored in the message summary memory 36.

In decision step 410, the user is given the option of accepting the recorded message summary or of recording a new message summary.

In step 412, if the message summary is accepted by the user, the message summary is converted to text by the voice-to-text module 38.

In step 414, the textual message summary is tagged to the underlying voice message for retrieval by the user at a later desired time.

Figure 5:
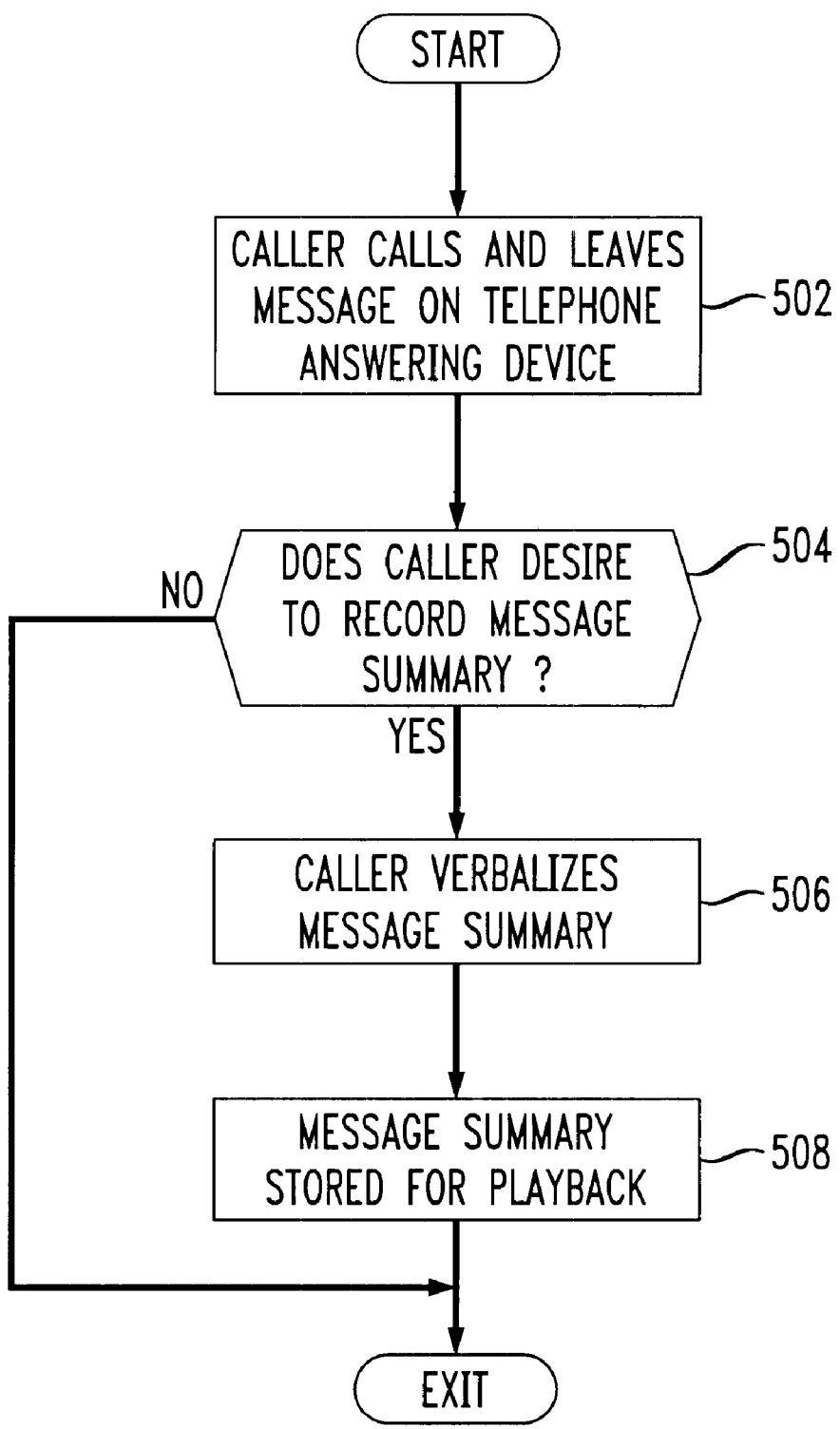
FIG. 5 is a flow chart illustrating an exemplary process by which a calling party records a verbal summary for their own voice message on the telephone answering device shown in FIG. 1.

An example of the operation of a calling party leaving a verbal message summary using a telephone answering device such as that shown in FIG. 1 is shown in FIG. 5.

In particular, with reference to FIG. 5, an incoming caller leaves a voice message on the telephone answering device 10 in step 502.

In decision step 504, the calling party determines whether or not to record a verbal message summary. In particular, the determination can be performed by appropriate prompting to the caller to select a particular DTMF key after leaving a voice message, and then prompting the caller for a message summary. For example, the outgoing greeting message can be "Please leave a message after the beep, then press "#" for more options." Then, as one of the options, the telephone answering device would prompt the caller to leave a message summary.

If the calling party desires to record a verbal message summary, in step 506, the calling party verbalizes a message summary which is stored in the message summary memory 36.

In step 508, the message summary of the calling party is stored for playback, e.g., with the calling party's underlying voice message or with other message summaries.

Figure 6:
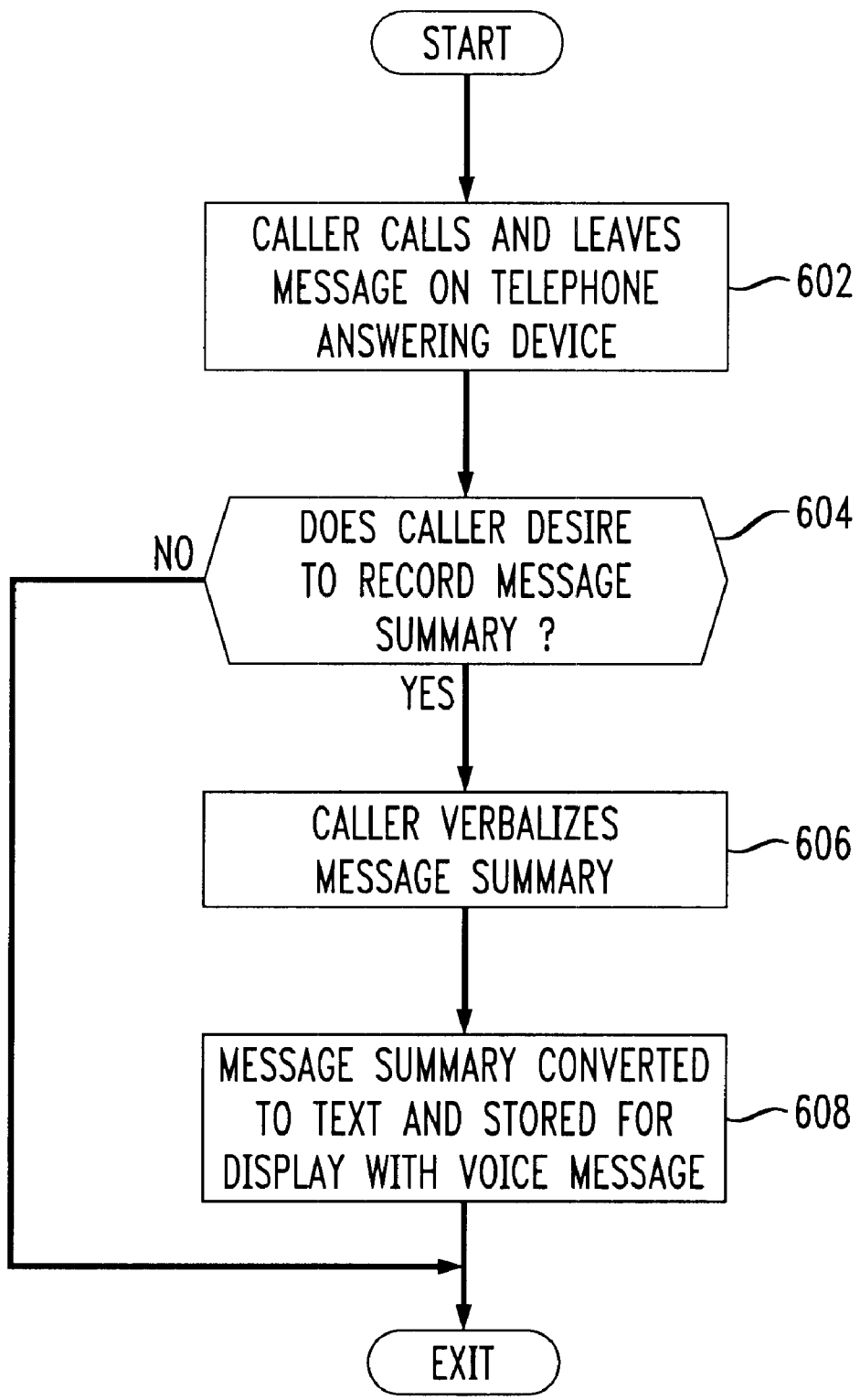
FIG. 6 is a flow chart illustrating an exemplary process by which a calling party records a verbal summary for their own voice message, and the verbal summary is converted to text by the message summary module in the telephone answering device shown in FIG. 1.

An example of the operation of a calling party leaving a textual message summary using a telephone answering device such as that shown in FIG. 1 is shown in FIG. 6.

In particular, with reference to FIG. 6, an incoming caller leaves a voice message on the telephone answering device 10 in step 602.

In decision step 604, the calling party determines whether or not to record a textual message summary. The determination can be performed in similar fashion to step 504 for the caller, but for the user. Of course, local buttons may be utilized for the user.

If the calling party desires to record a textual message summary, in step 606, the calling party verbalizes a message summary which is stored in the message summary memory 36.

In step 608, the message summary of the calling party is converted to text by the voice-to-text module 38 and stored for associated playback before playback of a calling party's underlying voice message.

Figure 7:
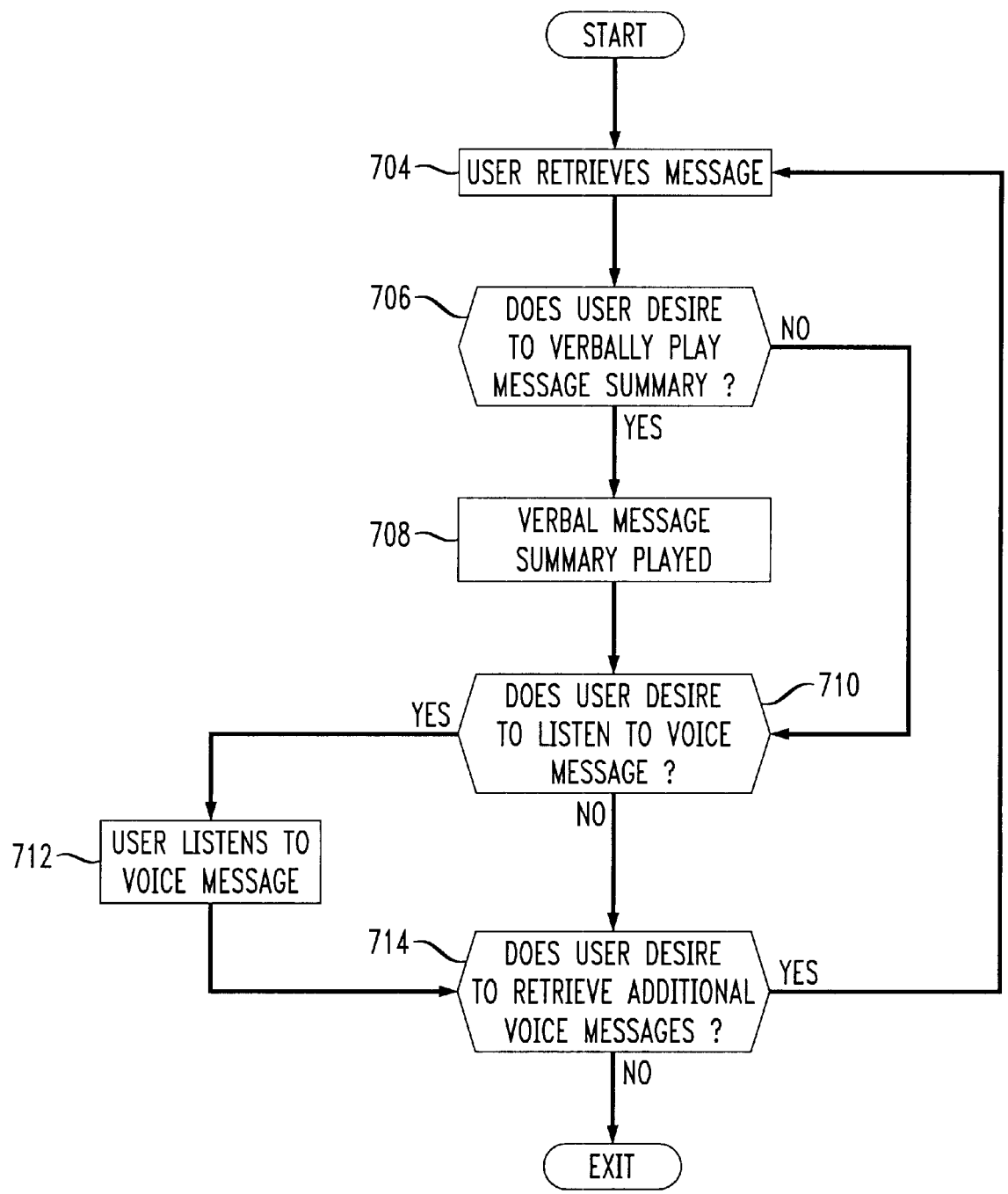
FIG. 7 is a flow chart illustrating an exemplary process by which a user retrieves a verbal summary for a desired recorded voice message using the telephone answering device shown in FIG. 1.

An example of the review of a verbal message summary recorded by a calling party or recorded by the user using a telephone answering device such as that shown in FIG. 1 is shown in FIG. 7.

In particular, with reference to FIG. 7, in step 704, the user retrieves a voice message. Of course, the voice message can be retrieved after a message summary if the user desires to listen to the full voice message, or even not at all.

Before or during retrieval of the voice message, in decision step 706, the user determines whether or not to verbally play a message summary associated with the current underlying voice message.

If the user determines to verbally play an associated message summary, in step 708, the user activates the message summary module 34 and listens to playback through the voice recorder/playback module 18 of the associated verbal message summary.

In decision step 710, after reviewing the verbal message summary, the user determines whether or not to listen to the full-length voice message accompanying the message summary.

In step 712, if the user decides to listen to the full-length underlying voice message, the voice message is then verbally played for the user.

In decision step 714, the user determines whether or not to retrieve additional voice messages from the telephone answering device 10.

Figure 8:
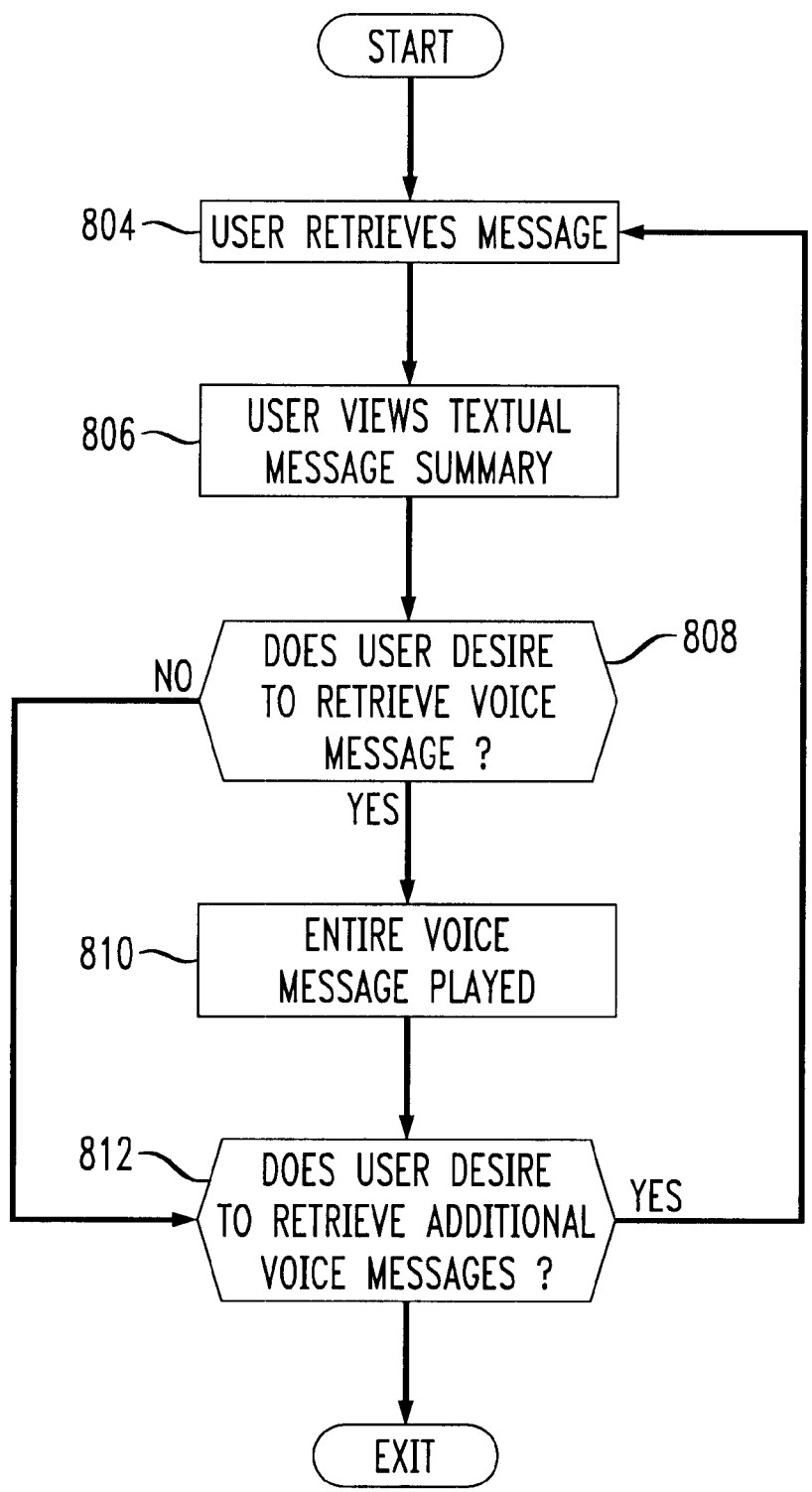
FIG. 8 is a flow chart illustrating an exemplary process by which a user retrieves a textual summary for a desired recorded voice message using the telephone answering device shown in FIG. 1.
Figure 9:
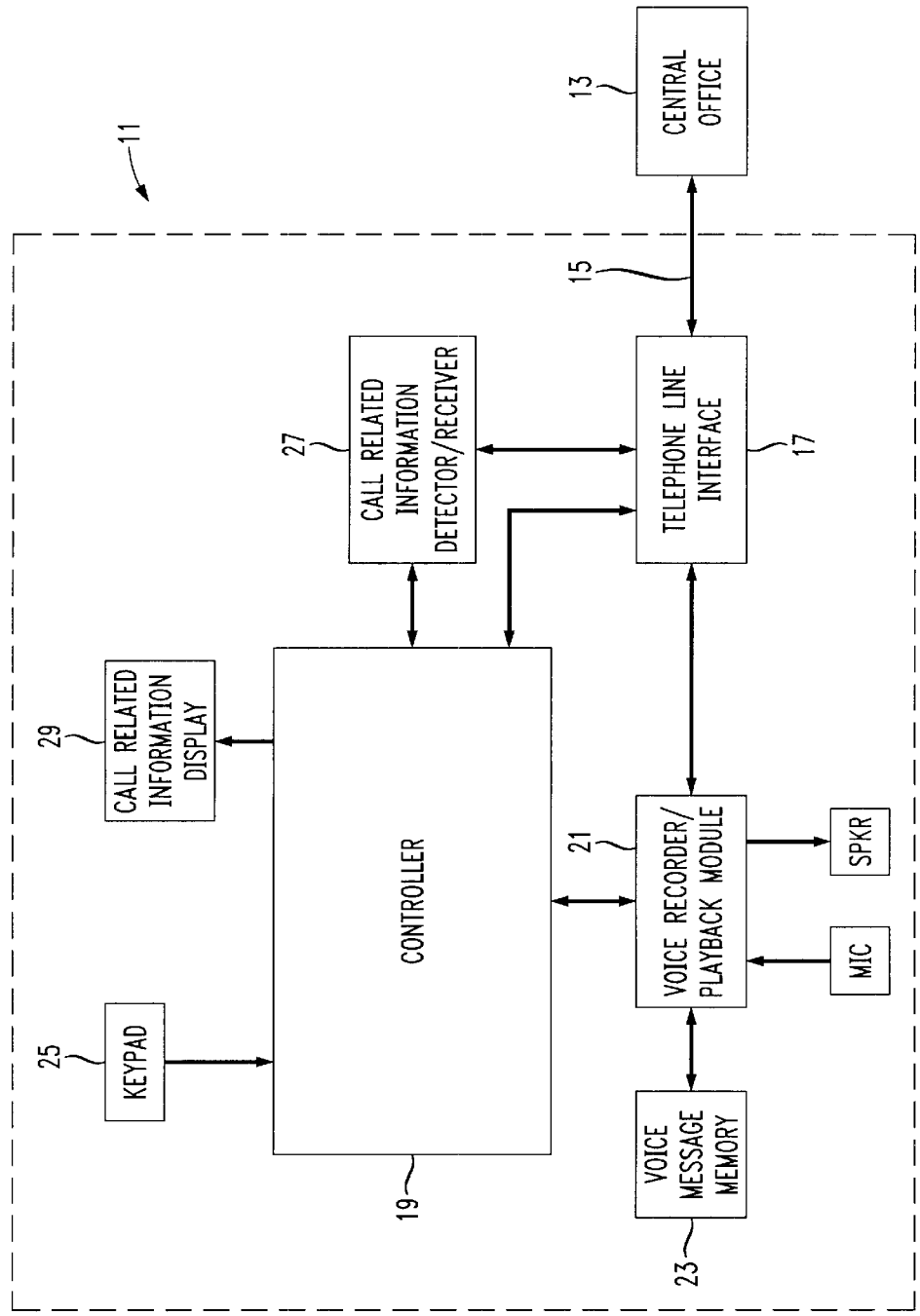
FIG. 9 illustrates a conventional telephone answering device capable of receiving and associating a telephone number and/or name of a caller with their recorded voice message.

An example of the review of a textual message summary recorded by a calling party or recorded by the user using a telephone answering device such as that shown in FIG. 1 is shown in FIG. 8.

In particular, with reference to FIG. 8, in step 804, the user retrieves a voice message. Of course, the voice message can be retrieved after a message summary if the user desires to listen to the full voice message, or even not at all.

Before or during retrieval of the voice message, in step 806, the textual message summary is displayed on the display 40 for review by the user.

In decision step 808, after reviewing the textual message summary, the user determines whether or not to listen to the full-length underlying voice message accompanying the message summary.

In step 810, if the user decides to listen to the voice message, the voice message is then verbally played for the user.

In decision step 812, the user determines whether or not to retrieve additional voice messages from the telephone answering device 10.

Thus, in accordance with the principles of the present invention, textual or audible message summaries are associated with full-length voice messages by the user or a calling party, and later reviewed by the user either before or during subsequent playback of the underlying voice message.

While the invention has been described with reference to the exemplary embodiments thereof, those skilled in the art will be able to make various modifications to the described embodiments of the invention without departing from the true spirit and scope of the invention.

What is claimed is:

1. A voice messaging system, comprising:
   a controller;
   a voice message memory;
   a message summary memory adapted to store a summary of a voice message stored in said voice message memory;
   a control activatable by a user to save a summary message into said message summary memory.

2. The voice messaging system according to claim 1, wherein:
   said message summary module directs storage of a summary message regarding a voice message stored in said voice message memory into said message summary memory.

3. The voice messaging system according to claim 1, wherein:
   said summary message is retrievable by a user of said voice messaging system.

4. The voice messaging system according to claim 1, wherein:
   said summary message is stored in said message summary memory in a verbal format.

5. The voice messaging system according to claim 1, wherein:
   said message summary is tagged to an associated recorded voice message.

6. A voice messaging system, comprising:
   a controller;
   a voice message memory;
   a message summary memory adapted to store a summary of a voice message stored in said voice message memory; and
   a voice-to-text module adapted to convert a verbal message summary into textual information.

7. The voice message system according to claim 6, wherein:
   said summary message is stored in said message summary memory in a textual format.

8. The voice messaging system according to claim 6, further comprising:
   a display adapted to display said textual information.

9. The voice messaging system according to claim 6, wherein:

said textual information includes a summary of content of an underlying recorded voice message.

10. The voice messaging system according to claim 9, further comprising:

a call related information detector/receiver to detect and receive at least one of a telephone number and a name of a calling party.

11. A method for recording a summary relating to content of an associated voice message recorded on a voice messaging system, comprising:

recording a voice message;

recording a message summary corresponding to content of said voice message; and associating said message summary with said voice message.

12. The method for recording a summary relating to content of an associated voice message recorded on a voice messaging system according to claim 11, further comprising:

prompting a caller to record said message summary.

13. The method for recording a summary relating to content of an associated voice message recorded on a voice messaging system according to claim 11, further comprising:

converting said message summary into a textual message summary.

14. The method for recording a summary relating to content of an associated voice message recorded on a voice messaging system according to claim 13, further comprising:

displaying said textual message summary on a display.

15. The method for recording a summary relating to content of an associated voice message recorded on a voice messaging system according to claim 11, further comprising:

storing said message summary in a message summary memory.

16. The method for recording a summary relating to content of an associated voice message recorded on a voice messaging system according to claim 11, wherein:

said message summary is a verbal message summary.

17. The method for recording a summary relating to content of an associated voice message recorded on a voice messaging system according to claim 11, further comprising:

retrieving said message summary separate from said voice message.

18. The method for recording a summary relating to content of an associated voice message recorded on a voice messaging system according to claim 11, further comprising:

retrieving said message summary in association with at least one other message summary.

19. The method for recording a summary relating to content of an associated voice message recorded on a voice messaging system according to claim 11, further comprising:

retrieving said message summary prior to retrieving said voice message.

20. The method for recording a summary relating to content of an associated voice message recorded on a voice messaging system according to claim 11, further comprising:

viewing said message summary on a display.

21. Apparatus for providing a message summary to a voice message, comprising:

means for retrieving a recorded message summary including content corresponding to a recorded voice message; and means for subsequently and separately retrieving said recorded voice message.

22. Apparatus for recording a summary relating to content of an associated voice message recorded on a voice messaging system, comprising:

means for recording a voice message;

means for recording a message summary corresponding to content of said voice message;

means for associating said message summary with said voice message; and means for prompting a caller to record said message summary.

* * * * *